(12) United States Patent
Garvin et al.

(10) Patent No.: US 11,764,559 B2
(45) Date of Patent: Sep. 19, 2023

(54) FIXTURE MOUNTING BRACKET WITH ADJUSTABLE FIXTURE POSITION AND FIXTURE INSTALLATION METHODS

(71) Applicant: Southwire Company, LLC, Carrollton, GA (US)

(72) Inventors: Barton L. Garvin, Western Springs, IL (US); Michael Dougherty, Wood Dale, IL (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 17/144,448

(22) Filed: Jan. 8, 2021

(65) Prior Publication Data

US 2021/0218234 A1    Jul. 15, 2021

Related U.S. Application Data

(60) Provisional application No. 62/958,977, filed on Jan. 9, 2020.

(51) Int. Cl.
*H02G 3/00* (2006.01)
*H02G 3/12* (2006.01)

(52) U.S. Cl.
CPC .................................. *H02G 3/125* (2013.01)

(58) Field of Classification Search
CPC .......... H02G 3/081; H02G 3/14; H02G 3/088; H02G 3/121; H02G 3/125
See application file for complete search history.

(56) References Cited

U.S. PATENT DOCUMENTS

| | | | |
|---|---|---|---|
| 2,316,389 A * | 4/1943 | Atkinson | H02G 3/126 |
| | | | 248/300 |
| 4,757,967 A * | 7/1988 | Delmore | E04B 2/7453 |
| | | | 248/218.4 |
| 4,967,990 A | 11/1990 | Rinderer | |
| 5,041,002 A | 8/1991 | Byrne | |
| 5,114,105 A | 5/1992 | Young | |
| 5,209,444 A | 5/1993 | Rinderer | |
| 5,386,959 A | 2/1995 | Laughlin et al. | |
| 5,405,111 A | 4/1995 | Medlin, Jr. | |
| 5,927,667 A | 7/1999 | Swanson | |
| 5,931,425 A | 8/1999 | Oliva | |
| 5,934,631 A | 8/1999 | Becker et al. | |
| 6,484,980 B2 | 11/2002 | Medlin, Sr. et al. | |
| 6,491,270 B1 | 12/2002 | Pfaller | |
| 6,967,284 B1 * | 11/2005 | Gretz | H02G 3/125 |
| | | | 174/57 |
| 7,036,782 B2 | 5/2006 | Cheatham et al. | |
| 7,173,186 B1 * | 2/2007 | Hageman | H02G 3/125 |
| | | | 174/57 |

(Continued)

FOREIGN PATENT DOCUMENTS

WO    WO2016168402    10/2016

*Primary Examiner* — Pete T Lee
(74) *Attorney, Agent, or Firm* — Merchant & Gould P.C.

(57) ABSTRACT

Disclosed herein are mounting brackets that allow fixtures to be adjustably attached to the bracket during installation, and positioned after attaching the mounting bracket to the mounting surface. The mounting brackets and installation methods disclosed herein provide more efficient installations of fixtures including as electrical junction boxes, communications boxes, conduit, pipe, lighting, and cables.

20 Claims, 5 Drawing Sheets

(56) References Cited

U.S. PATENT DOCUMENTS

| | | | |
|---|---|---|---|
| 7,271,335 B2 | 9/2007 | Dinh | |
| 7,472,875 B2 | 1/2009 | Rinderer | |
| 7,654,495 B2 * | 2/2010 | Adrian | F04D 25/088 |
| | | | 248/200.1 |
| 8,091,721 B1 | 1/2012 | Gretz | |
| 8,403,277 B2 | 3/2013 | Nuernberger et al. | |
| 9,261,120 B2 | 2/2016 | Colangelo et al. | |
| 9,397,491 B2 | 7/2016 | Birli et al. | |
| 9,583,926 B2 | 2/2017 | Ye | |
| 9,822,926 B2 | 11/2017 | Nikayin et al. | |
| 9,825,446 B2 | 11/2017 | Korez et al. | |
| 9,929,549 B2 | 3/2018 | Witherbee et al. | |
| D816,466 S | 5/2018 | Gomez | |
| D819,879 S | 6/2018 | Oudina et al. | |
| 10,006,613 B2 | 6/2018 | Oudina et al. | |
| 10,077,866 B2 | 9/2018 | Witherbee | |
| 2016/0308342 A1 * | 10/2016 | Witherbee | F16B 2/245 |
| 2017/0229852 A1 | 8/2017 | Jones et al. | |

* cited by examiner

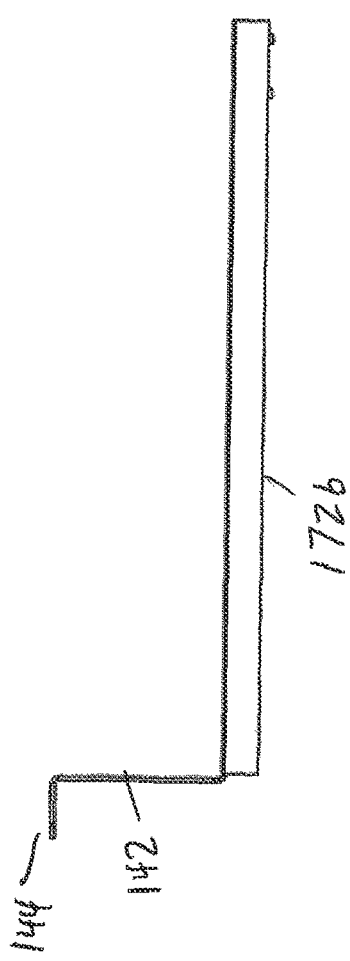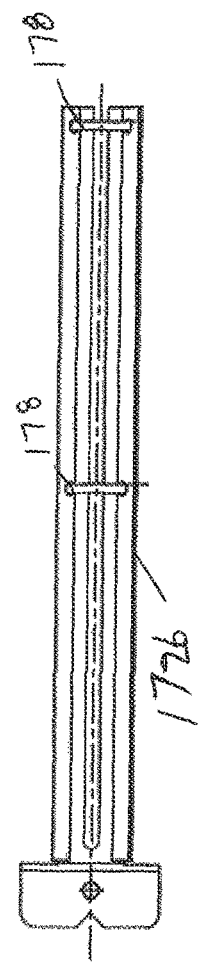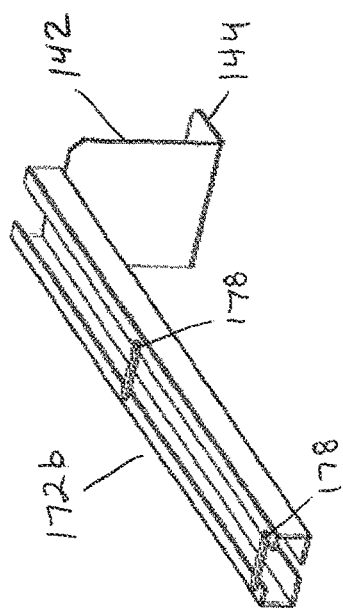
FIG. 7A
FIG. 7B
FIG. 7C

FIXTURE MOUNTING BRACKET WITH ADJUSTABLE FIXTURE POSITION AND FIXTURE INSTALLATION METHODS

CROSS REFERENCE TO RELATED APPLICATION

This application is a non-provisional application which claims a benefit of priority to U.S. Provisional Application No. 62/958,977, filed Jan. 9, 2020, the entire contents of which are incorporated herein by reference.

SUMMARY

Disclosed herein are fixture mounting brackets and methods of installing mounting brackets and fixtures. Fixture mounting brackets disclosed herein provide more efficient and precise installations of fixtures. Installation methods using fixture mounting brackets disclosed herein can be comprise pre-wiring fixtures prior to attaching the fixture to a mounting bracket, and prior to fastening the mounting bracket to a building structure. Methods of positioning fixtures on a mounting bracket without detaching the fixtures from the mounting bracket are also contemplated herein.

BACKGROUND

Installation of fixtures within a building structure is a common and frequent task during building constructions and maintenance. Conventional fixture installation methods have relied on attaching fixtures such as electrical junction boxes directly to the building structures, such as beams within walls and ceilings. However, complex constructions can require several fixtures be installed within a single wall cavity. In such an arrangement, mounting brackets that span the distance from one stud to another can provide a secure attachment position even where fixtures are not directly adjacent to the building structure.

Conventional mounting brackets can typically feature a fixed metal sheet configured to be attached to two beams, the sheet having a series of threaded holes along its width such that a fastener can be advanced through the fixture, and into one of the threaded holes. However, such arrangement does not allow for adjusting the position of the fixture after the fixture is attached to the bracket. Thus, conventional methods are often installed prior to positioning the fixture, and can require the installer to detach the fixture from the mounting bracket to reposition the fixture.

It would be advantageous to provide an improved fixture mounting bracket that would allow an installer to adjust the position of fixtures without detaching the fixture from the mounting bracket. It would also be advantageous to provide a mounting bracket that could accommodate pre-wired fixtures, while retaining flexibility in the positioning of the fixture.

BRIEF DESCRIPTION OF THE DRAWINGS

The foregoing and other objects, features and advantages of the embodiment and methods disclosed herein will be apparent from the following description of particular embodiments thereof, as illustrated in the accompanying drawings. The drawings are not necessarily to scale, emphasis instead being placed upon illustrating the principles of the embodiments and methods disclosed herein.

FIG. 7A represents a front view of a second bracket body.

FIG. 7B represents a bottom view of the second bracket body showing in FIG. 7A.

FIG. 7C represents a bottom perspective view of the second bracket body showing in FIG. 7A.

DETAILED DESCRIPTION

Figure 1:
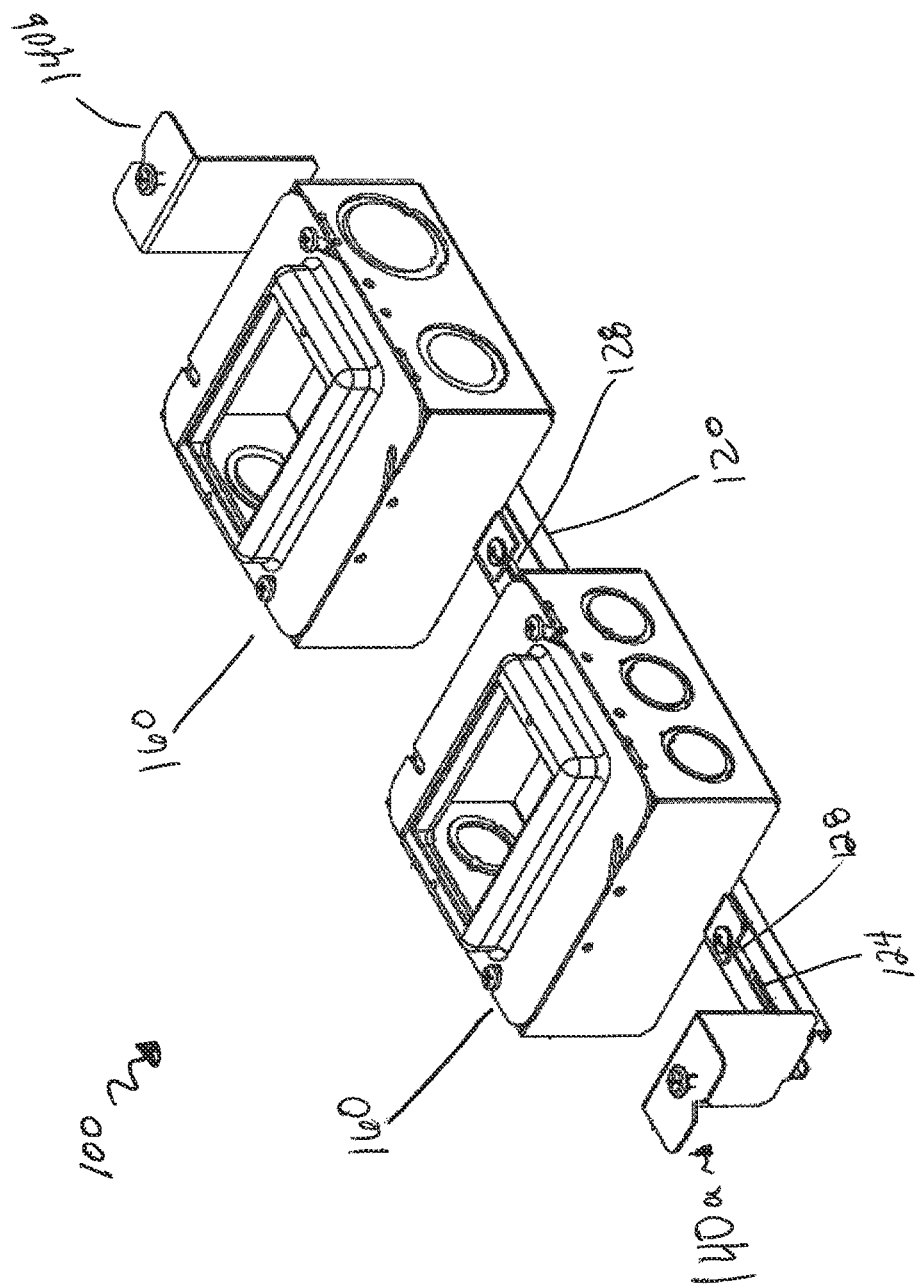
FIG. 1 represents a perspective view of an adjustable junction box mounting bracket.

The information that follows describes embodiments with reference to the accompanying figures, in which preferred embodiments are shown. The foregoing may, however, be embodied in many different forms and should not be construed as limited to the illustrated embodiments set forth herein.

The phrase "a" or "an" entity as used herein refers to one or more of that entity.

References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, unless otherwise indicated or made clear from the context, the term "or" should generally be understood to mean "and/or" and, similarly, the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein.

The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "upper," "lower," "below,"

and the like, are words of convenience and are not to be construed as implying a positional or chronological order or otherwise limiting any corresponding element unless expressly stated otherwise.

The information that follows details various embodiments of the disclosure. For the avoidance of doubt, it is specifically intended that any particular feature(s) described individually in any one of these paragraphs (or part thereof) may be combined with one or more other features described in one or more of the remaining paragraphs (or part thereof). In other words, it is explicitly intended that the features described below individually in each paragraph (or part thereof) represent aspects of the disclosure that may be taken in isolation and/or combined with other aspects of the disclosure. The skilled person will appreciate that the claimed subject matter extends to such combinations of features and that these have not been recited in detail here in the interest of brevity.

Disclosed herein are fixture mounting brackets comprising a first bracket body comprising a first attachment end and a first coupling arm; a second bracket body, the second bracket body comprising a second attachment end and a second coupling arm, wherein the second coupling arm is configured to be slidingly coupled to the first coupling arm to form a bracket channel and positioning bar cavity, the bracket channel and positioning bar cavity being continuous between the first and second coupling arms; and a channel fastener slidingly coupled within the bracket channel.

Fixture mounting brackets disclosed herein generally can have any form that allows it to be attached between two beams or wall studs (e.g., wood studs of a framed house), and allow the fixture to be attached to the mount in both an adjustable position and a fixed position, with respect to the beams or wall studs. Certain embodiments, aspects, and features of the fixture mounting brackets are described in FIGS. 1-7.

As shown in FIG. 1, fixture mounting bracket 100 can comprise one or more fixtures attached to positioning bar 120 that extends between attachment ends 140a and 140b. Positioning bar 120 can comprise bracket channel 124 that allows fixtures 160 to slide continuously between attachment ends 140a and 140b in an adjustable manner, without detaching fixture 160 from fixture mounting bracket 100. Fixtures 160 remain attached to the positioning bar in an adjustable position during adjustment by channel fastener 128.

Generally, the fixture mounting brackets disclosed herein are not limited to any particular fixture, and can be applied to secure and position any sort of fixtures. In certain embodiments, fixtures disclosed herein can comprise an electrical junction box, such as wall outlets and light switches. In other embodiments, the fixtures can comprise a junction box for communication and data cables. Alternatively, fixtures can comprise any sort of element commonly found within building structures, including power cables either alone or within conduit. Communication cables often can be can secured to the side of a beam using staples. However, bunching multiple power cables alongside communication cables and data cables can lead to interference and poor performance. Thus, spacing multiple cables between two beams can be advantageous. The fixture mounting brackets disclosed herein can provide positioning of a plurality of cables, either as individual cables or within conduit, by attaching the cables or conduit to the mounting bracket with a simple brace (e.g., a two-hole conduit strap). Fixture fasteners can be inserted on each side of the brace to secure the cables or conduit to the fixture mounting bracket, at a desired position between the beams and away from power cables secured to the side of the stud. Plumbing pipes can be secured in a similar manner, to reduce movement within walls and the dissipation of heat from pipes to the structure of the house.

Any number of fixtures can be attached to the mounting bracket, limited only by the bracket span and the total width of the fixtures. In certain embodiments, the mounting bracket can comprise a single fixture. In other aspects, the mounting brackets disclosed herein can comprise a plurality of fixtures. The fixtures can be the same or different. For instance, the fixture can comprise two (or three, or four, etc.) electrical junction boxes, or an electrical junction box and a plumbing pipe. Alternatively, the fixture can comprise an electrical junction box and a communication cable junction box. Alternatively, the fixture can comprise a lighting fixture, and conduit. The size of the fixtures is limited only by the cavity in which they are to be installed. In certain embodiments, fixtures can have a depth of less than 4", less than 3" or less than 2". The mounting bracket can have a depth according to the maximum depth of a fixture or cavity. Alternatively, the mounting bracket can have a depth somewhat less than the depth of a cavity, to allow unmounted cables and conduit to extend behind the mounting bracket if necessary. Fixtures of different sizes can be mounted to the same bracket. Spacers can be added as necessary to align the front face of each fixture with a face of a wall or ceiling. Similarly, fixture width is only limited by the dimensions of the fixture mounting bracket and the maximum bracket span.

Figure 2:
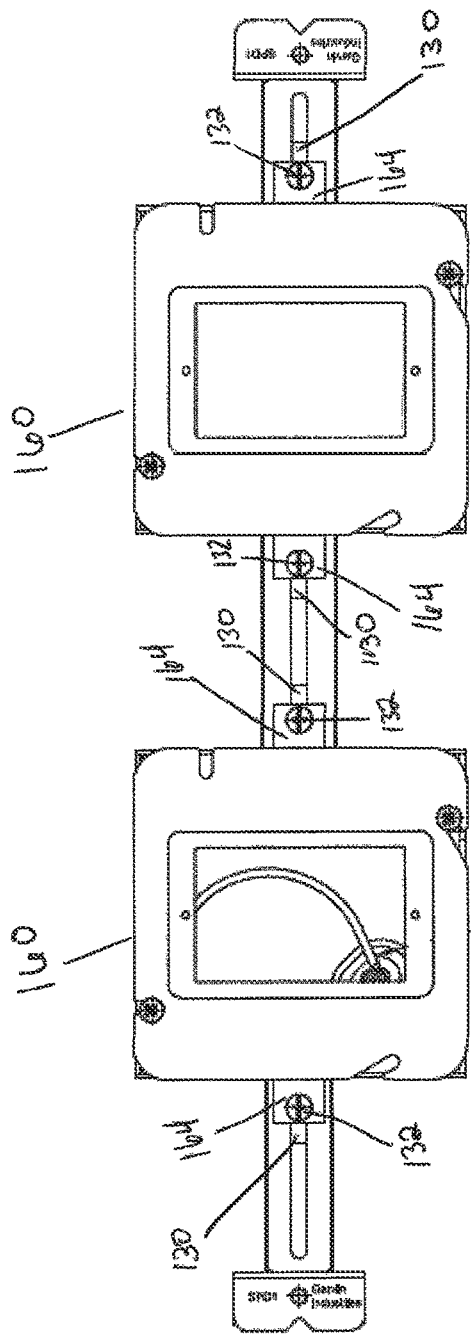
FIG. 2 represents a front view of the adjustable junction box mounting bracket shown in FIG. 1.

FIG. 2 shows a front view of the fixture mounting bracket of FIG. 1, and provides a distinct view of the arrangement between the fixtures and the channels. As is shown, bracket channel 124 can extend continuously for a majority of the length of positioning bar 120. The dimension and shape of the channel as described herein is not limited, and generally can be any that allow the position of the fixture between the attachment ends to be adjusted without detaching the fixture from the mounting bracket completely. For instance, the bracket channel can be an elongated slit having rounded ends to generally match the profile of a threaded portion of a screw, as shown by bracket channel 124 of FIG. 2. Thus, the width of the channel can be slightly larger than the portion of the channel fastener traversing the channel. In certain embodiments, the width of the channel can be less than 1", less than ½", in a range from about ¾" to about ¾", or about ⅟₁₆" to about ⅛" larger than the width of any common screw threading.

The bracket channel of fixture mounting brackets disclosed herein can have a generally linear shape, as does bracket channel 124 depicted in FIG. 2. Alternatively, the bracket channel can have undulations that indicate particular positions along the bracket channel. For instance, the bracket channel can be generally linear, and comprise dips that preserve a constant channel width. In certain aspects, dips can be positioned at set intervals that can be commonly used by installers. For instance, the bracket channel can comprise a dip every inch, every 2 inches, every 4 inches, in a centered or evenly divided position with respect to common bracket spans. In a similar manner, the bracket channel can comprise a zig-zag or wavy pattern throughout the length of the bracket channel. Dips or undulations can be included along the bracket channel without interrupting the continuity of the bracket channel, such that the fixture can be slidably positioned along the bracket channel despite deviation from a linear design.

Similarly, the length of the bracket channel is not limited to any particular length, and can generally approximate the bracket span in certain aspects. For instance where a bracket span is 16", the channel length can be about 15" or about 15½" measured based on the distance covered by the bracket channel between the attachment ends. The bracket channel can be continuous along its entire length.

Also shown in FIG. 2 are channel fasteners 128 used to attach fixtures 160 to positioning bar 120 in either an adjustable position or a fixed position. Channel fasteners 128 can comprise a channel plate 130 and fixture fastener 132. Prior to attaching fixtures 160, channel fastener 128 can be in an intermediate position wherein the fixture fastener is attached to the channel plate, but not advanced into a fixed position with respect to positioning bar 120. Fixtures 160 can be attached to the positioning bar by sliding external tab 164 between positioning bar 120 and fixture fastener 132, such that fixture 160 is attached in an adjustable position relative to attachment ends 140a, b. Alternatively, fixtures comprising a closed aperture in an external tab can be attached by first removing the fixture fastener from the channel fastener, and inserting the fixture fastener through the closed aperture and the channel plate aperture. Fixtures attached through external features can be advantageous compared to attaching the fixture via internal features, at least because external features (e.g., external tab 164) remain accessible even after the fixture is configured. Thus, mounting brackets which allow the fixtures to be attached through external features preserve the ability to pre-wire the fixtures prior to mounting the fixtures on the mounting bracket.

Generally, fixtures can be connected to the mounting bracket through two external tabs, each connected to a separate channel fastener. Fixtures can comprise an external tab on opposing lateral sides of the fixture, to provide optimal support to the fixture, once mounted, without sacrificing the ability to position the fixture along the positioning bar. As stated above, attaching fixtures 160 to the positioning bar through external features of the fixture allows the installer to configure the fixture completely prior to attaching the fixture to the mounting bracket. Thus, an installer can pre-wire fixtures 160 shown in FIG. 2, working at waist height and with the aid of a work surface before attaching the fixture to the mounting bracket, and then attaching the mounting bracket to the beams within a wall or ceiling. In this manner, the position of the fixture can be adjusted even after the fixture is prepared for installation (e.g., pre-wired), and after the bracket is mounted to the wall. Preserving the ability to position the fixture as the final step of the installation minimizes the amount of time the installer is required to spend working in the tight space.

In certain aspects, the channel fasteners can be accessible to the installer on the same side of the wall that the fixture will face. Such aspects are distinguished from conventional mounting brackets, such as bar hangers for ceiling fans, which can be accessed from the reverse side of a plenum to secure the fixture to the mounting bracket. In certain aspects, the channel fastener can be accessible from a front face of the mounting bracket. An installer can then insert the fixture into the channel bracket, with or without prewiring wiring, and position the fixture along the positioning bar without risk of dropping elements of the mounting bracket or fixture within a wall cavity.

In certain aspects, the fixture mounting bracket can be a single, unitary piece of a set width and having a stud attachment at each end of a channel. Such embodiments can comprise a bracket span similar to that of stud spacing commonly employed in building structures. As used herein the bracket span of the mounting bracket refers to the distance between attachment ends of the mounting bracket, or more generally, the width of a gap between two beams or wood studs spanned by the mounting bracket. For instance, the bracket span can be a fixed width of 8", 10", 12", 14", 16", 18", 20", 22", or 24".

Figure 3:
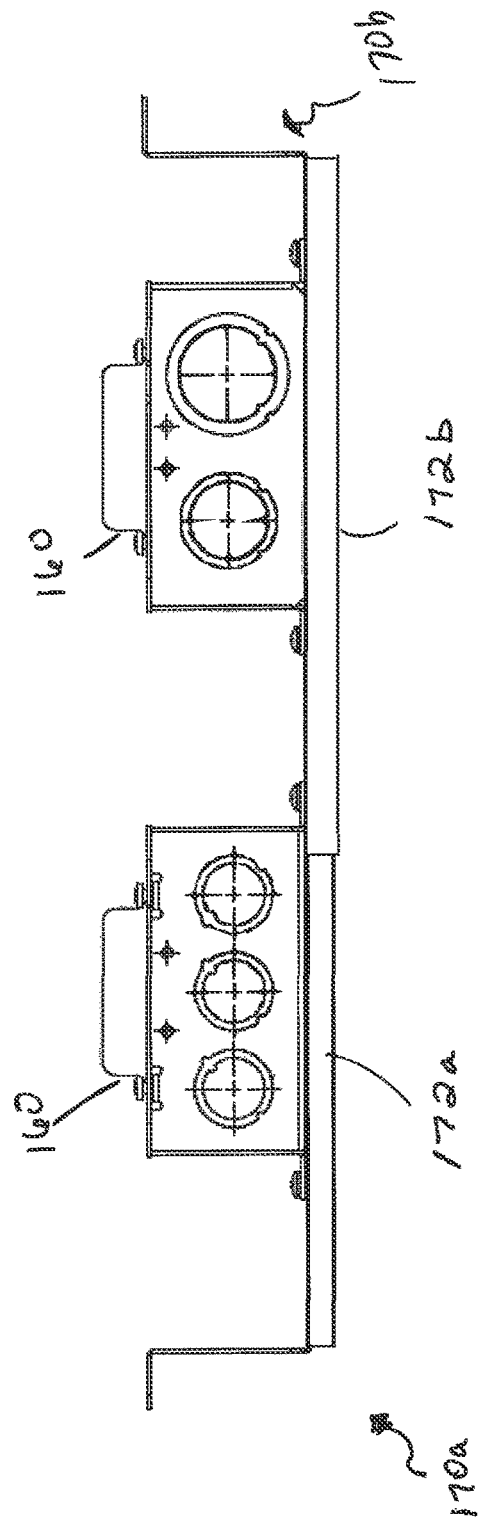
FIG. 3 represents a bottom view of the adjustable junction box mounting bracket shown in FIG. 1, which is a mirror image of the top view of the adjustable junction box mounting bracket.

Alternatively, the fixture mounting bracket can comprise an adjustable bracket span, such as by the implementation of multiple telescoping pieces configured to slidably couple to one another. FIG. 3 represents a top view of fixture mounting bracket 100 as being formed by first and second bracket bodies 170a, b being slidably coupled together through first and second coupling arms 172a, b, to form positioning bar 120. In this manner, mounting brackets disclosed herein can have both a minimum and maximum bracket span. In certain aspects, the minimum bracket span represents a width of positioning bar 120 at its shortest configuration, where the coupling arms 172a, b are in a fully coupled position. In certain aspects, the minimum bracket span can be 4", 6", about 8", about 10", about 12", about 14", about 16", about 18", or about 20".

In contrast, the maximum bracket span represents a configuration where coupling arms 172a, b are coupled with minimal overlap, without sacrificing the structural integrity of positioning bar 120. Therefore, in certain aspects, the maximum bracket span can be about 16", about 18", about 20", about 22", about 24", about 26", about 28", about 30", or about 36". It follows that mounting brackets disclosed herein are contemplated as having a range of bracket spans by any combination of the minimum and maximum bracket spans disclosed. Thus, in certain aspects mounting brackets can have a bracket span ranging from about 10" to about 20", from about 8" to about 16", or from about 12" to about 24". FIG. 3 represents a fixture mounting bracket in an intermediate coupled position, between the maximum and minimum bracket span.

Figure 4:
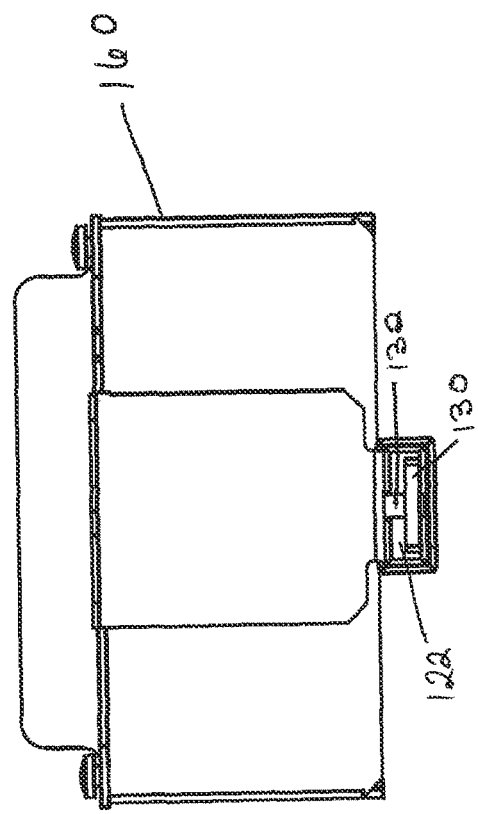
FIG. 4 represents a side view of the adjustable junction box mounting bracket shown in FIG. 1.
Figure 6D:
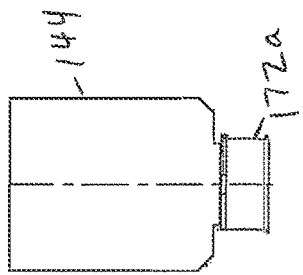
FIG. 6D represents a left side view of the first bracket body showing in FIG. 6A.
Figure 6E:
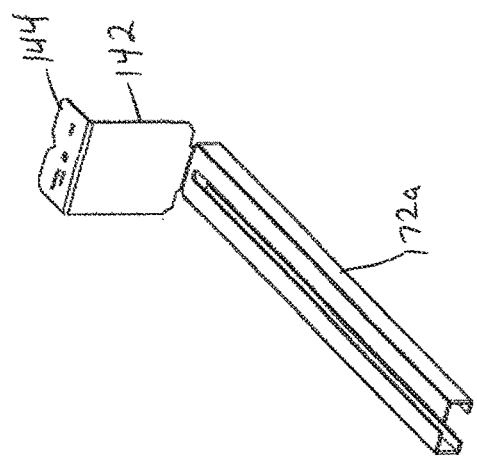
FIG. 6E represents a perspective view of the first bracket body showing in FIG. 6A.
Figure 6A:
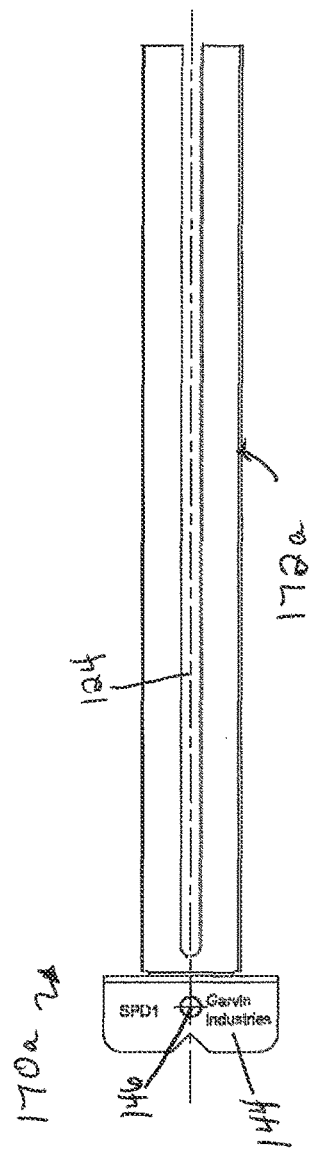
FIG. 6A represents a top view of a first bracket body.
Figure 6B:
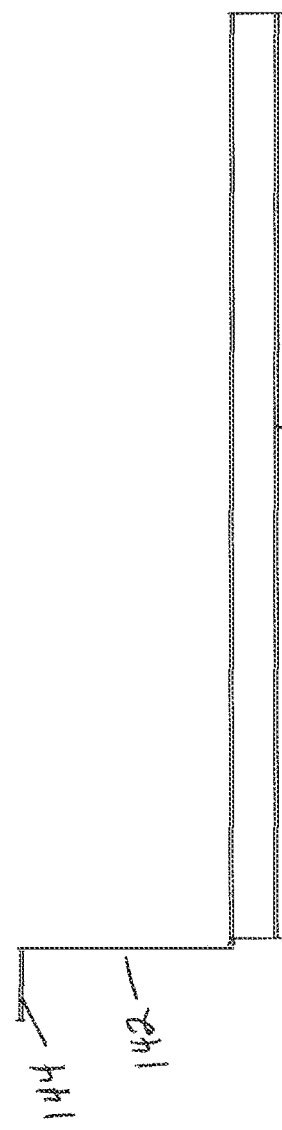
FIG. 6B represents a front view of the first bracket body showing in FIG. 6A.
Figure 6C:
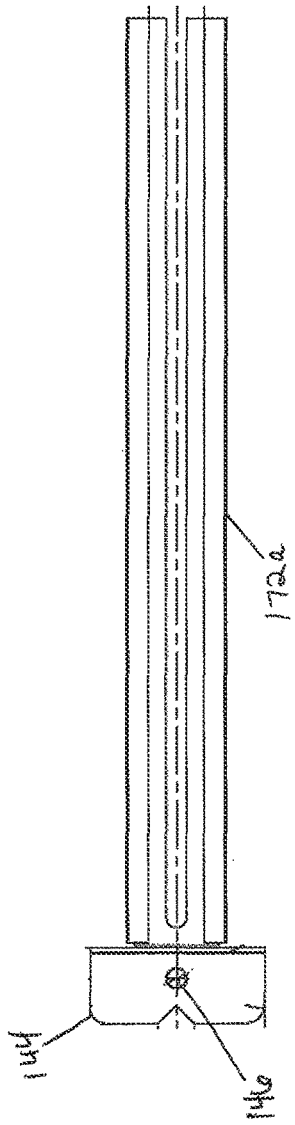
FIG. 6C represents a bottom view of the first bracket body showing in FIG. 6A.

Those of skill in the art will appreciate that the channel fastener can be any that allows for adjustable positioning of a fixture along the length of the positioning bar. For instance, channel fasteners disclosed herein can comprise a channel plate and a fixture fastener. FIG. 4 represents a side view of fixture mounting bracket 100, and further shows the adjustable arrangement between fixture 160, bracket channel 124 and positioning bar 120. As described above, coupling arms 172a, b of the first and second bracket bodies are shown as concentric channels and coupled to form positioning bar 120. The continuous space formed by the coupling represents positioning bar cavity 122, which allows channel fastener 128 to slide along positioning bar 120 unencumbered, while retaining a connection between positioning bar 120 and fixture 160. Channel fastener 128 comprises channel plate 130 disposed within positioning bar cavity 122, and is able to slide along the length of the positioning bar. Fixture fastener 132 is connected with channel plate 130 across bracket channel 124, via aperture 131 in channel plate 130. Fixture fastener 132 can be advanced into the aperture until channel plate becomes secured against an internal wall of the positioning bar cavity 122, securing channel fastener 128 in position, along with any fixtures attached to the mounting bracket by the channel fastener. Alternatively, fixture fastener 132 can be partially withdrawn from the channel plate to push the channel plate away from the internal wall of the positioning bar cavity 122, and allow channel fastener to move freely along the length of the positioning bar 120, as shown in FIG. 4.

Figure 5:
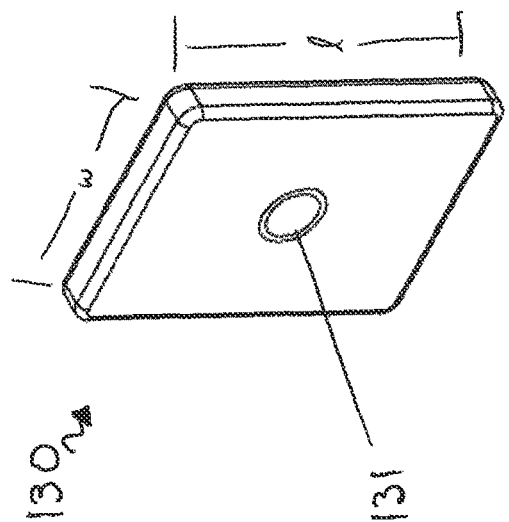
FIG. 5 represents a perspective view of a channel fastener plate.

The channel plate can be any shape that promotes, or does not deter the functions of the channel fastener as described herein. FIG. 5 shows an embodiment of channel plate 130 having a rectangular shape. Such plates can be placed within the channel such that a longer dimension l aligns with the longer dimension of the positioning bar cavity, where a shorter dimension w aligns orthogonal to the longer dimension of the positioning bar cavity. Each of the positioning bar cavity and channel can be described as having an axis that runs between the attachment ends and through the center of the particular element. In certain aspects the longest dimension of the channel plate can align parallel to a central axis of any element defined by positioning bar 120, particularly a channel axis, a positioning bar cavity axis, and a positioning bar axis. Channel plates disclosed herein can comprise rounded corners and edges such that the channel plate is able to slide within the positioning bar cavity freely without hanging on edges within the positioning bar cavity, such as can be present at the coupling junction of first and second bracket bodies.

In certain aspects, the channel plate can be shaped such that the channel plate aperture remains positioned adjacent to the bracket channel, to ensure that the channel plate aperture remains accessible to the installer in any position. Those of ordinary skill in the art will understand that the width of the channel plate can be somewhat less than the internal dimension of the bracket channel to facilitate movement of the channel plate within the positioning bar cavity. In certain aspects, the difference in the width of the channel plate and the internal dimension of the bracket channel can be related to the difference between the width of a threaded portion of the fixture fastener and the width of the bracket channel (as measured generally orthogonal to the bracket span). Embodiments where the channel plate difference is less than or equal to the fixture fastener difference can ensure that the channel plate aperture remains centered with respect to the positioning bar cavity, and that the channel plate aperture can be accessed by the fixture fastener at all positions of the channel plate.

The dimensions of the fixture fastener can be similarly described with respect to dimensions of the positioning bar cavity. For instance, the length of the fixture fastener can be long enough to extend through a portion of the fixture (e.g., an external tab), across the bracket channel, and into the channel plate. However, the fixture fastener must terminate before advancing into a back plate of the positioning bar or beyond the positioning bar. Thus, the fixture fasteners disclosed herein can have a length only slightly greater than the depth of the positioning bar cavity. Alternatively, the positioning bar can be configured such that the fixture fastener can extend through the positioning bar cavity and beyond the positioning bar, by having an opening in the back face of the positioning bar. FIGS. 6-7 represent several views of first and second bracket bodies capable of such an arrangement, with an open back plate as part of each of the first and second coupling arms. Coupling arm 172a shown in FIGS. 6A-E as having the smaller outer dimension can have a relatively narrow opening that maintains a boundary for the positioning bar cavity and configured to retain channel plate 130 without interfering with the advancement of a fixture fastener of any length. Coupling arm 172b, shown in FIGS. 7A-C can comprise a relatively large opening, as material on the back plate is only needed as a support to guide the coupling of the first and second coupling arms. The larger of the coupling arms, e.g., coupling arm 172b, can also comprise any number of braces 178 across the back face of the coupling arm, as shown in FIGS. 7B-7C. Bracing the coupling arm in this manner provides additional structural support to the positioning bar, when first and second bracket bodies 170a, b are coupled together.

Attachment ends suitable for the mounting brackets disclosed herein are not limited to a particular shape or implementation, and generally can be any suitable for securing the bracket to a beam or wall stud known in the art. For instance, each attachment end can comprise positioning plate 142 and attachment flange 144, the attachment flange having an attachment aperture 146, as present in the embodiment depicted by FIGS. 6-7. In this arrangement, positioning plate 142 can be positioned against the inside face of a beam, and attachment flange 144 secured to an outer face of the beam with a beam fastener (e.g., nails, screws, etc.). Fixture mounting brackets having alternative stud attachment mechanisms are also contemplated herein.

Methods for installing a fixture between two beams are also disclosed herein, and can comprise fastening a first attachment end of a mounting bracket to a first beam; fastening the second attachment end to the second beam; adjusting the position of the fixture by sliding the fixture along the mounting bracket relative to the first and second attachment ends; and securing the position of the fixture. Methods disclosed herein can further comprise configuring a fixture prior to attaching the fixture to the mounting bracket, and attaching the fixture to the mounting bracket. Generally, the method steps disclosed herein can be performed in any order, where applicable, and are not limited to the order presented above. For example, in certain aspects it can be advantageous to attach the fixture to the mounting bracket prior to fastening the mounting bracket to the beam. Additionally, or alternatively, it can be advantageous to pre-wire a fixture prior to attaching the fixture to the mounting bracket. In other embodiments, it can be advantageous to pre-mount the fixture to the mounting bracket prior to configuring the fixture for use. In such aspects, the fixtures can be configured (e.g., wired) prior to fastening the mounting bracket to the beam, or after fastening the mounting bracket to the beam.

Generally, fastening the first and second attachment ends of the mounting bracket can be conducted by any suitable method that results in the mounting bracket being secured to the first and second beam. For instance, where the beam is a wooden wall or ceiling stud, fastening the attachment ends can comprise driving a nail or screw through an aperture in the attachment flange. Alternatively, where the beam is a metal stud, a hole can be drilled in the beam to accept a bolt through the hole and the attachment end to secure the mounting bracket. In some aspects, the first and second beam will be parallel, or substantially parallel, as in the wall frame of a residential building. However, embodiments where the first and second beam are not parallel, and instead are at an angle (e.g., 30°, 45°, 60°, 90°, etc.) are also contemplated herein.

In some aspects, methods disclosed herein can further comprise adjusting the span of the mounting bracket prior to fastening the second attachment end of the mounting bracket to a second beam. In such aspects, the fixture mounting bracket can comprise two bracket bodies slidably coupled to one another to allow the bracket span to be altered by sliding the two bracket bodies toward or away from each other. Alternatively, the mounting bracket can comprise a single bracket body at a fixed bracket span.

Methods disclosed herein can also comprise attaching a fixture to the mounting bracket in an adjustable position with respect to the attachment ends of the mounting bracket. The adjustable position can be adjustable by slidably coupling the fixture to the mounting bracket, for example by attaching the fixture to a channel fastener in an intermediate position as described above. The fixture can be attached in this intermediate, adjustable position before or after fastening the first or second attachment end (or any portion of the mounting bracket) to the beam. In certain aspects, an installer can prepare the mounting bracket for installation by attaching each of the fixtures required for a particular installation in an intermediate, adjustable position. The mounting bracket containing the fixtures in an intermediate, adjustable position can then be fastened to the beams as described above.

Once the mounting bracket has been fastened to the beams, the position of the fixture on the mounting bracket can be adjusted without detaching the fixture from the mounting bracket. This carries the advantage of limiting the amount of work that must be done at the installation site, which often can be at an uncomfortable or inaccessible location. Additionally, the mounting bracket, fixtures, and fasteners operate as a single unit at this stage, and no loose pieces or fasteners are required for the final positioning of the fixtures along the mounting bracket. Thus, aspects contemplated herein are advantageous compared to methods using brackets with a series of holes requires removing a screw from the mounting bracket completely, and replacing the screw. In contrast, brackets and methods disclosed herein allow the fixtures to be positioned with the mounting bracket fastened to the building structure, without risking the loss of fasteners within the wall. Moreover, the ability to slide the fixture along the channel allows for finer precision in the positioning of the bracket than possible with brackets having a series of holes at multiple positions. Positioning the fixtures after fastening the mounting bracket to the building structure also allows the position to be determined based on the actual desired position of the fixture, and not a calculated position. Positioning the fixtures in their actual position can reduce errors.

Fixtures also can be removed from the mounting bracket, even after the mounting bracket has been attached to the beams. For instance, where a previously installed electrical junction box requires maintenance, replacement, or removal, the fixture can be removed by retracting the channel fastener from the intermediate, adjustable position until the fixture is completely detached from the mounting bracket. The channel fastener can remain within the mounting bracket as the fixture is removed, and the fixture can be repaired or replaced as needed. If replaced, the fixture can again be attached to the mounting bracket in an adjustable manner, positioned between the attachment ends, and secured in a fixed position.

With the fixture in the desired position, the fixture can be secured to the mounting bracket in a fixed position. Securing the fixture in a fixed position can comprise merely advancing a fixture fastener of a channel fastener from an intermediate adjustable position into a secure, fixed position. In certain embodiments disclosed herein, the fixture fastener can be advanced until the channel plate and fixture are adjacent to opposing sides of the channel. Implementation of washers at the interface between the channel, fixture, fixture fastener, and channel plate are also contemplated. While securing step can be reversible in certain aspects, the fixture generally can remain in the fixed position absent intervention by the installer.

The invention claimed is:

1. A fixture mounting bracket comprising:
 a first bracket body, the first bracket body comprising a first attachment end and a first coupling arm;
 a second bracket body, the second bracket body comprising a second attachment end and a second coupling arm, wherein the second coupling arm is slidingly coupled to the first coupling arm to form a bracket channel and a positioning bar cavity, the bracket channel and the positioning bar cavity each being continuous between the first and second coupling arms; and
 a first channel fastener slidingly coupled within the bracket channel;
 a second channel fastener slidingly coupled within the bracket channel; and
 a fixture comprising a first external tab connected to the first channel fastener, and second external tab connected to the second channel fastener.

2. The mounting bracket of claim 1, wherein:
 the first channel fastener comprises:
 a first channel plate positioned within the bracket channel, the first channel plate comprising a first fastener aperture; and
 a first fixture fastener threaded through the first external tab and into the first fastener aperture.

3. The mounting bracket of claim 2, wherein the second channel fastener comprises:
 a second channel plate positioned within the bracket channel, the second channel plate comprising a second fastener aperture; and
 a second fixture fastener threaded through the second external tab and into the second fastener aperture.

4. The mounting bracket of claim 3, wherein at least one of the first channel plate and the second channel plate have a rectangular shape, with the longer dimension aligning with a longer dimension of the positioning bar.

5. The mounting bracket of claim 4, wherein at least one of the first channel plate and the second channel plate comprises rounded corners.

6. The mounting bracket of claim 4, wherein at least one of the first channel plate and the second channel plate comprises rounded edges.

7. The mounting bracket of claim 3, wherein the at least one of the first channel fastener and the second channel fastener is a screw.

8. The mounting bracket of claim 1, wherein a width of the bracket channel is less than ½ inch.

9. The mounting bracket of claim 1, wherein the bracket channel is linear.

10. The mounting bracket of claim 1, wherein at least one of the first external tab and the second external tab comprises a closed aperture.

11. The mounting bracket of claim 1, wherein at least one of the first external tab and the second external tab comprises an open aperture.

12. The mounting bracket of claim 3, wherein each of the first external tab and the second external tab comprises an open aperture.

13. The mounting bracket of claim 1, wherein the fixture is an electrical junction box, a communications junction box, light fixture, a conduit, a pipe, or any combination thereof.

14. The mounting bracket of claim 3, wherein the fixture is an electrical junction box.

15. The mounting bracket of claim 1, comprising a plurality of electrical junction boxes.

16. The mounting bracket of claim 1, comprising a bracket span ranging from about 10 inches to about 20 inches.

17. The mounting bracket of claim 1, comprising a bracket span ranging from about 12 inches to about 24 inches.

18. A method for installing a fixture between two beams, the method comprising:
 prewiring the fixture of the mounting bracket of claim 1;

securing the mounting bracket between the two beams by fastening a first attachment end of the first bracket body to a first beam and fastening a second attachment end of the second bracket body to a second beam; and adjusting the position of the fixture along the mounting bracket relative to the first and second attachment ends after securing the mounting bracket between two beams.

19. The method of claim 18, wherein adjusting the position of the fixture along the mounting bracket relative to the first and second attachment ends after securing the mounting bracket between two beams comprises sliding the fixture along a bracket channel with the first and second channel fasteners in an intermediate position.

20. The method of claim 18, wherein the two beams are beams within a ceiling.

\* \* \* \* \*